United States Patent [19]
Liao

[11] Patent Number: 5,687,628
[45] Date of Patent: Nov. 18, 1997

[54] GUIDING DEVICE FOR WOOD CUTTING

[76] Inventor: Shu-Fen Liao, 105 Hsiangshan St., Tali county, Taichung Hsien, Taiwan

[21] Appl. No.: 596,517

[22] Filed: Feb. 5, 1996

[51] Int. Cl.⁶ .................................................. B27B 9/04
[52] U.S. Cl. .......................... 83/745; 83/522.18; 83/761; 83/829; 33/500
[58] Field of Search .......................... 83/581, 743, 745, 83/821, 829, 761, 762, 763, 767, 522.15, 522.17, 522.18, 522.25; 30/289, 293; 33/465, 466, 471, 468, 469, 495, 496, 497, 498, 499, 500

[56] References Cited

U.S. PATENT DOCUMENTS

| | | | |
|---|---|---|---|
| 248,652 | 10/1881 | Hoermann | 33/468 |
| 306,418 | 10/1884 | Muller | 33/469 |
| 311,911 | 2/1885 | Muller | 33/469 |
| 761,272 | 5/1904 | Wagniere et al. | 33/465 |
| 840,628 | 1/1907 | Johnson | 33/471 |
| 2,942,634 | 6/1960 | Gathercoal | 83/767 X |
| 4,312,133 | 1/1982 | Mima | 33/468 |
| 4,916,822 | 4/1990 | Johnson | 33/465 X |
| 4,920,658 | 5/1990 | Hile | 33/465 X |
| 4,961,360 | 10/1990 | Peel et al. | 83/829 X |
| 5,020,233 | 6/1991 | Syken | 33/465 |
| 5,475,931 | 12/1995 | Wei | 33/471 |

FOREIGN PATENT DOCUMENTS

| 473356 | 5/1951 | Canada | 33/471 |
|---|---|---|---|

*Primary Examiner*—Rinaldi I. Rada
*Assistant Examiner*—Clark F. Dexter
*Attorney, Agent, or Firm*—Charles E. Baxley, Esq.

[57] ABSTRACT

A guiding device for wood cutting includes a positioning member, a guiding member, and a member for releasably securing the guiding member to the positioning member and allowing relative pivotal movement between the positioning member and the guiding member when in a released position. The positioning member includes a horizontal section, a vertical section extending downwardly along a longitudinal direction of the horizontal section so that the horizontal and vertical sections may abut against two adjacent sides of a wood piece to be cut. A first circular section extends longitudinally from an end of the positioning member, and a boss projects outwardly from an upper side of the first circular section. The guiding member includes a second vertical section for guiding a saw blade, a second circular section extending longitudinally from an end thereof and having a recess defined in an underside thereof for receiving the boss of the positioning member, thereby allowing relative pivotal movement between the positioning member and the guiding member. A plurality of annularly disposed holes are defined in one of the first and second circular sections, and at least one positioning protrusion projects from the other of the first and second circular sections for releasably engaging with the annularly disposed holes.

1 Claim, 5 Drawing Sheets

5,687,628

GUIDING DEVICE FOR WOOD CUTTING

BACKGROUND OF THE INVENTION

1. Field of the Invention

The present invention relates to a guiding device for wood cutting and, more particularly, to a guiding device which provides a reliable guide for oblique wood cutting.

2. Description of Related Art

So called "D.I.Y." (Do It Yourself) furniture and other articles are popular in the domestic and foreign countries, especially in the United States, in which the manufacturers offer materials (such as wood pieces, bolts, and other elements) and a design diagram so that the consumers may cut wood pieces and assemble the article by themselves. The consumers may not only enjoy a new type of entertainment and have an opportunity to work with the family but also benefit from inexpensive price of the products as the labor cost to the manufactures for assembling the products is saved. Accordingly, the consumers may purchase the products with a lower price and assemble the products in a manner as they wish.

When assembling the furniture, a common problem to the consumers is that they are not professional carpenters such that the wood pieces after cutting often suffer from misalignment of cutting lines and inaccuracy in sizes and angles, thereby adversely affecting the assembly and the overall aesthetics. As a result, this failure may cause a mental bar to the consumers to purchase the "D.I.Y." furniture or other articles again.

Therefore, there has been a long and unfulfilled need for a device to mitigate and/or obviate the above-mentioned problems.

SUMMARY OF THE INVENTION

The present invention provides a guiding device for wood cutting which comprises a positioning member, a guiding member, and a means for releasably securing the guiding member to positioning member and allowing the relative pivotal movement between the positioning member and the guiding member when in a released condition.

The positioning member includes a horizontal section, a vertical section extending downwardly along a longitudinal direction of the horizontal section so that the horizontal and vertical sections may abut against two adjacent sides of a wood piece to be cut. A first circular section extends longitudinally from an end of the positioning member, and a boss projects outwardly from an upper side of the first circular section.

The guiding member includes a second vertical section for guiding a saw blade and having a second circular section extending longitudinally from an end thereof and a recess defined in an underside thereof for receiving the boss of the positioning member, thereby allowing relative pivotal movement between the positioning member and the guiding member. A plurality of annularly disposed holes are defined in one of the first and second circular sections, and at least one positioning protrusion projects from the other of the first and second circular sections for releasably engaging with the annularly disposed holes.

In accordance with one aspect of the invention, the annularly disposed holes are defined in the first circular section around the boss, while the at least one protrusion is formed on the second circular section around the recess.

In accordance with a further aspect of the invention, an index is formed on an upper side of the horizontal section, while the second circular section includes a scale provided on a peripheral wall thereof for indicating the angular relationship between the positioning member and guiding member.

In accordance with another aspect of the invention, the means for releasably securing the guiding member to the positioning member is a bolt.

In accordance with still another aspect of the invention, the boss includes a threaded bore therein, and the second circular section includes a hole further defined in an upper side thereof through which the bolt extends to engage with the bore in the boss.

In accordance with yet another aspect of the invention, a spring is positioned in the recess and between the first and second circular sections to exert an upward force to urge the at least one protrusion to disengage with the annularly disposed holes, thereby allowing the pivotal movement of the guiding member relative to the positioning member.

In accordance with still another aspect of the invention, the second vertical section of the guiding member includes at least one hole defined therein for respectively receiving a magnetic element therein to assist in guiding of the saw blade by providing an attraction to the saw blade.

Other objects, advantages, and novel features of the invention will become more apparent from the following detailed description when taken in conjunction with the accompanying drawings.

DESCRIPTION OF THE PREFERRED EMBODIMENT

Figure 1:
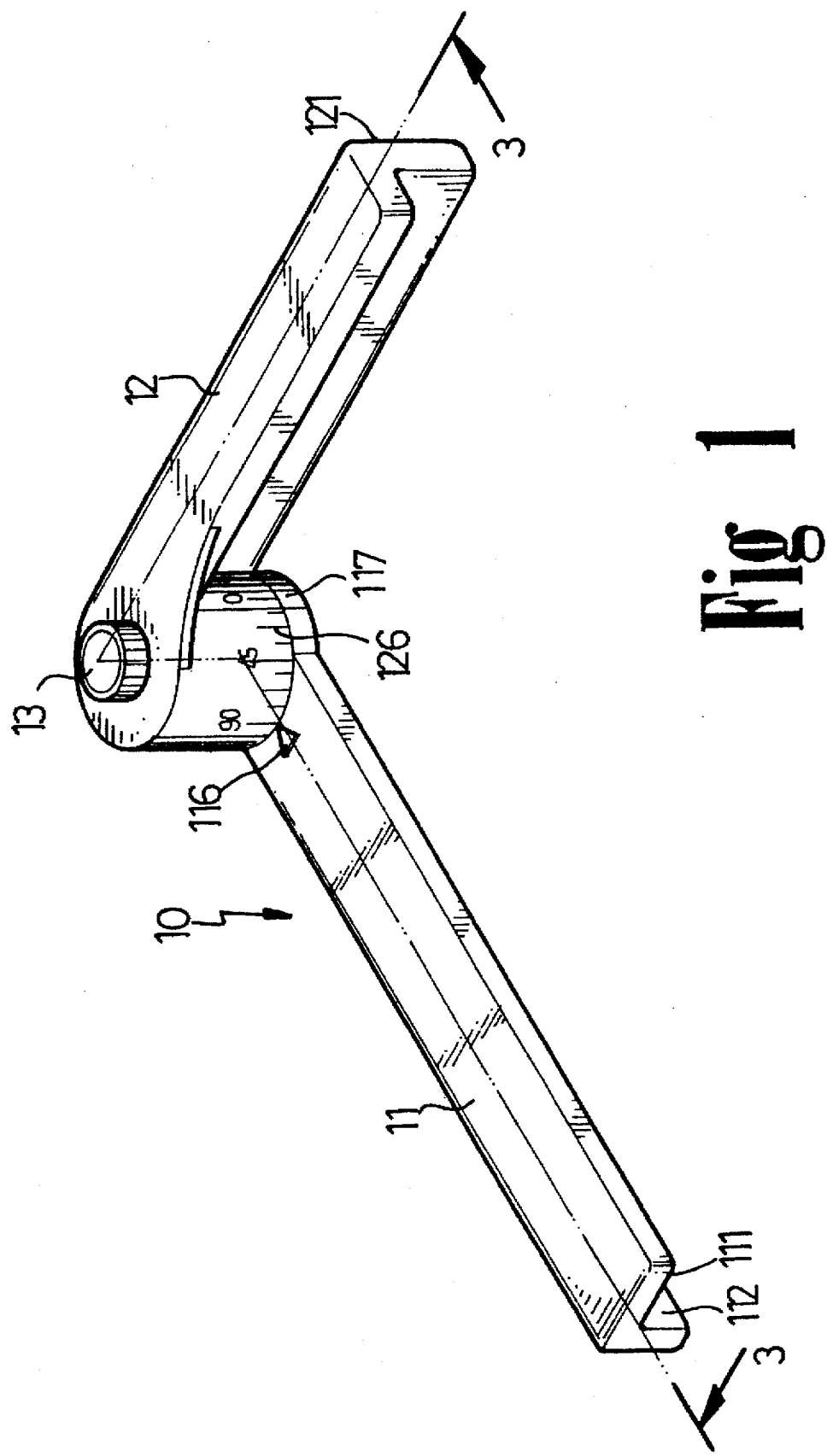
FIG. 1 is a perspective view of a guiding device for wood cutting in accordance with the present invention.
Figure 2:
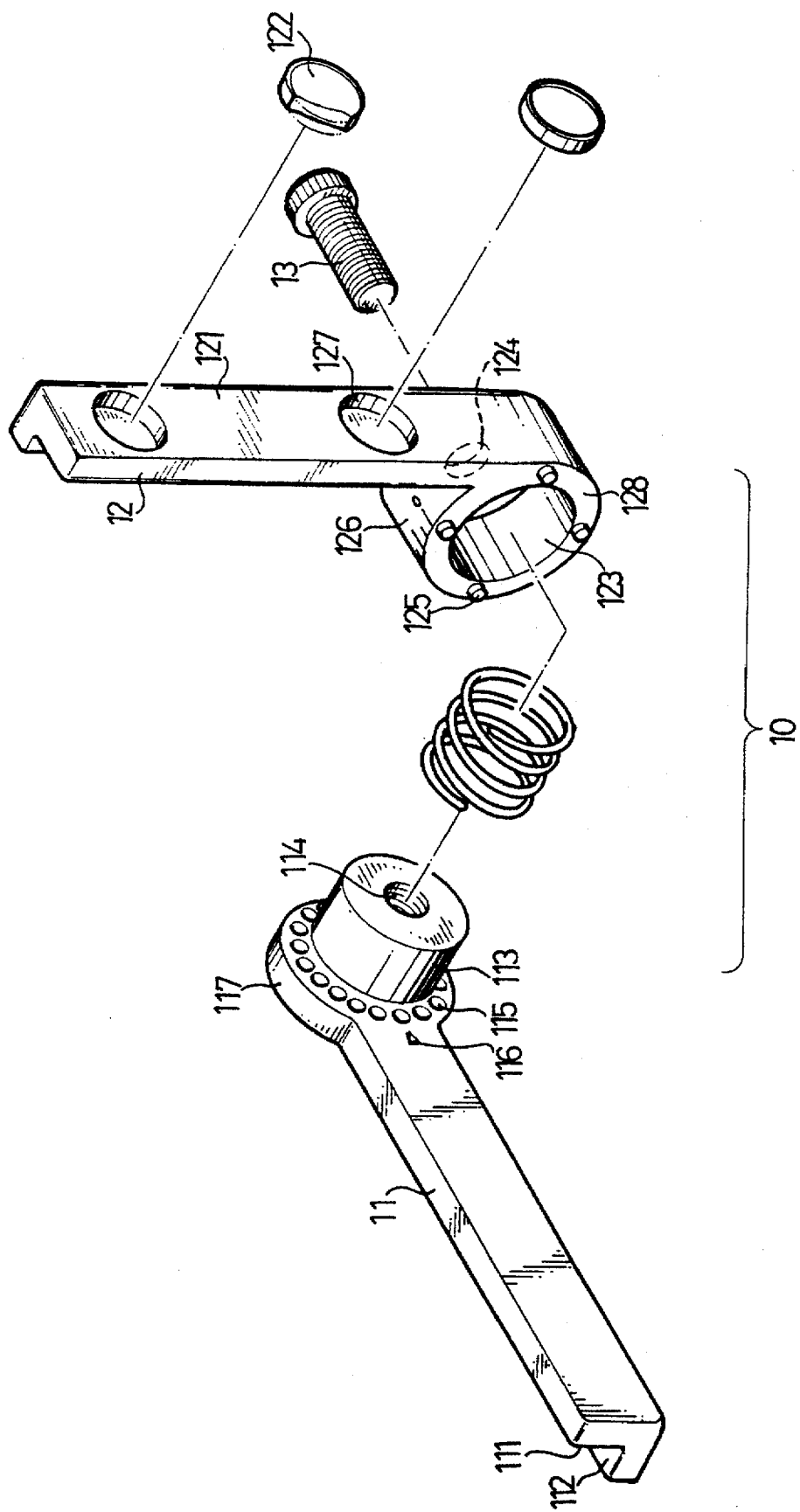
FIG. 2 is an exploded view, in a different direction, of the guiding device in accordance with the present invention.
Figure 3:
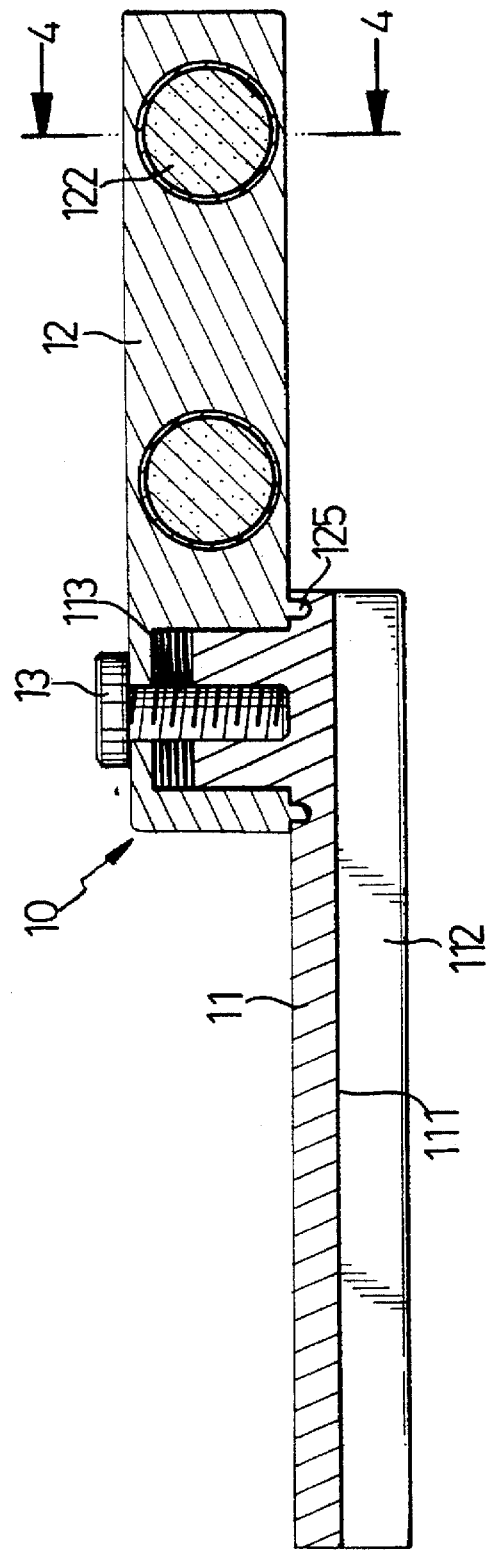
FIG. 3 is a cross-sectional view taken along L-shaped section line 3—3 in FIG. 1.
Figure 4:
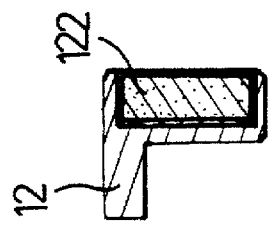
FIG. 4 is a cross-sectional view taken long line 4—4 in FIG. 3.

Referring to the drawings and initially to FIGS. 1 to 4, a guiding device for wood cutting in accordance with the present invention is designated by reference numeral "10" and generally includes a positioning member 11 and a guiding member 12 which is mounted to the positioning member 11 at an adjustable angle. The positioning member 11 is substantially L-shaped in section and includes a planar horizontal section 111 and a planar vertical section 112 extending downwardly along a longitudinal direction of the planar horizontal section so that the two planar sections 111 and 112 may abut against two adjacent sides (e.g., an upper side and a lateral side) of a wood piece to be cut, which will be explained later. Preferably, the planar vertical section 112 extends downwardly from a longitudinal edge of the horizontal planar section 111. The positioning member 11 further includes a first circular section 117 extending longitudinally from an end thereof, and a boss 113 projects outwardly and perpendicularly from an upper side (see FIGS. 2 and 3) of the first circular section 117. A threaded bore 114 is defined centrally in the boss 113, while a plurality of annularly disposed holes 115 are defined on the first circular section 117 around the boss 113. An index 116 is formed on the upper side of the horizontal section 111.

Still referring to FIGS. 1 to 4, the guiding member 12 is also substantially L-shaped in section and includes a vertical planar section 121 in which two holes 127 are defined for respectively receiving a magnetic element 122 therein, the purpose of which will be explained hereinafter. The guiding member 12 further includes a second circular section 128 extending longitudinally from an end thereof and having a recess 123 defined in an underside thereof for receiving the boss 113. A hole 124 is defined in an upper side of the second circular section 128. At least one positioning protrusion 125 (there are four protrusions 125 in this embodiment) projects from the underside of the second circular section 128 and is disposed around the recess 123 for releasably engaging in peripheries defining the holes 115 of the first circular section 117. A scale 126 is provided on a peripheral wall of the second circular section 128. Preferably, a spring (not labeled) is positioned in the recess 123 and between the first and second circular sections 117 and 128 to assist in pivotal movement of the guiding member 12 relative to the positioning member 11 when adjusting the angular relationship therebetween.

Figure 5:
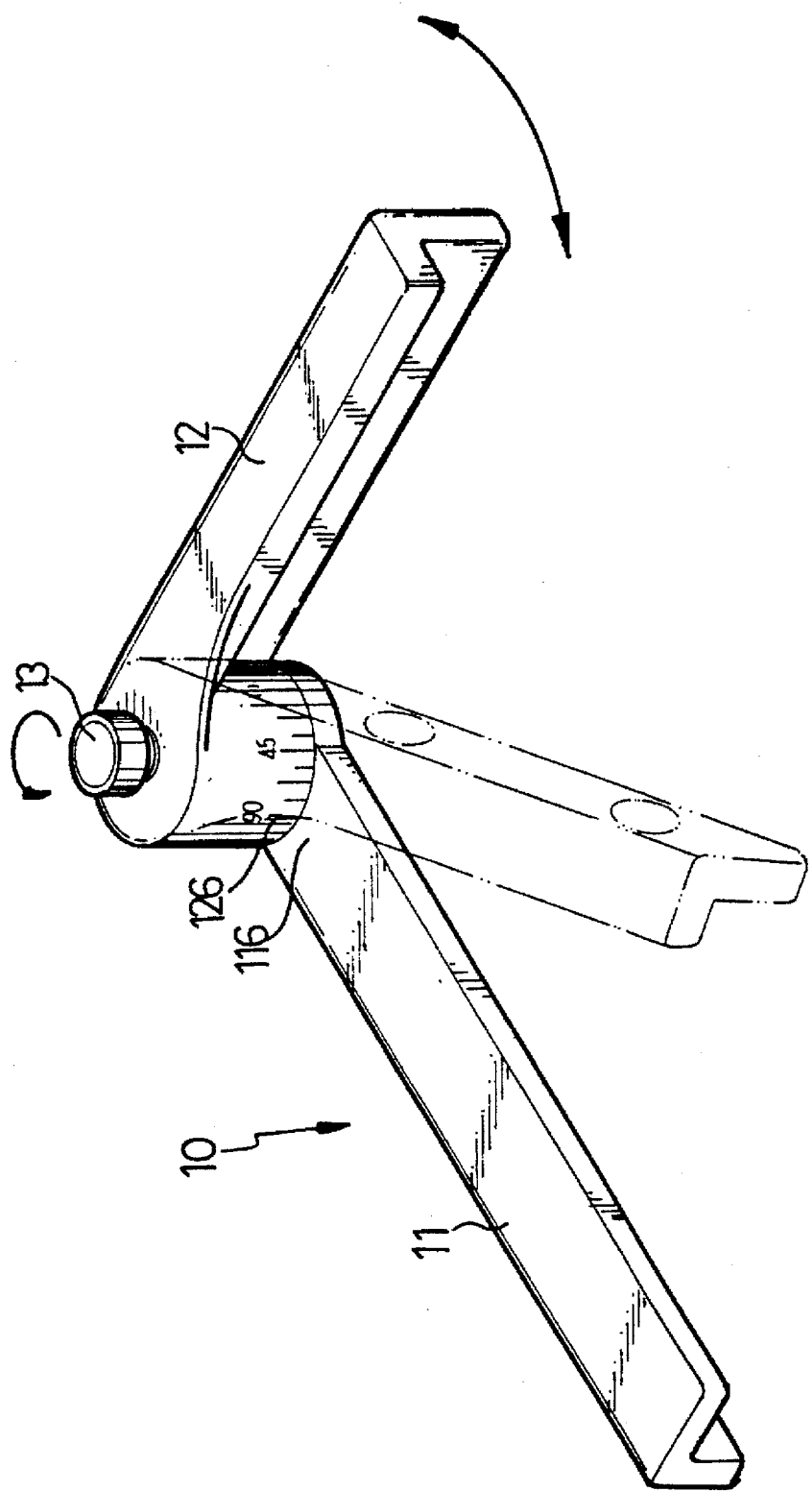
FIG. 5 is a perspective view illustrating adjustment of the guiding device.

The boss 113 of the positioning member 11 is received in the recess 123 of the guiding member 12 with the protrusions 125 of the latter fittingly received in the holes 115 of the former. Then, a bolt 13 is extended through the hole 124 in the second circular section 128 securely to fasten the positioning member 11 and the guiding member 12 together. It is appreciated that the guiding member 12 is secured to the positioning member 11 at a desired angle therebetween for proceeding with desired oblique cutting of wood. The desired angle is achieved by manually releasing the bolt 13 to allow pivotal movement of the guiding member 12 relative to the positioning member 11, in which the spring exerts an upward force to urge the protrusions 125 to disengage with the holes 115. Then, the guiding member 12 is pivoted through an angle to the desired position which can be read readily from the scale 126 indicated by the index 116. Thereafter, the bolt 13 is re-tightened to urge the protrusions 125 to extend into the holes 115 again. FIG. 5 schematically illustrates adjustment of the angle between the positioning member 11 and the guiding member 12.

Figure 6:
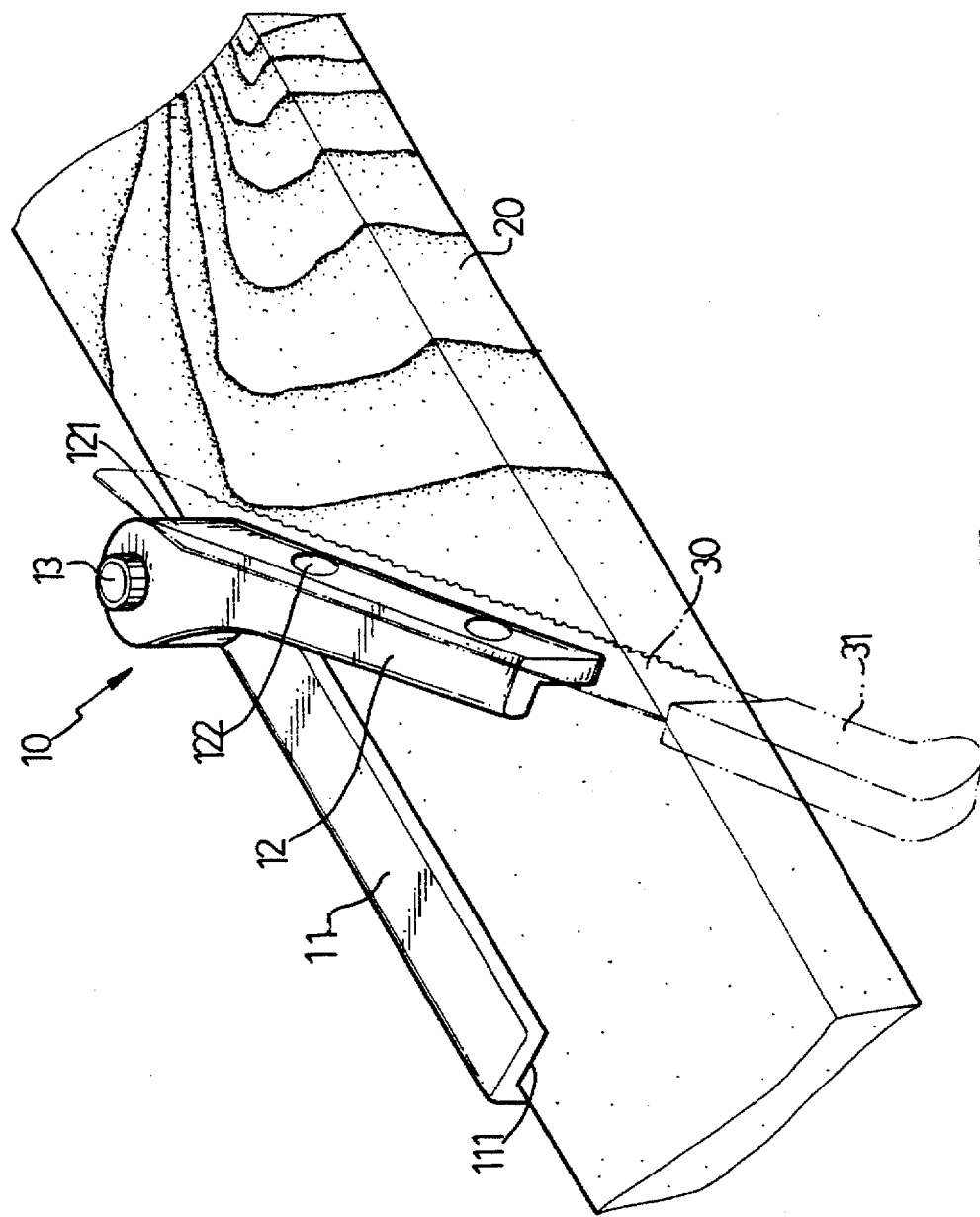
FIG. 6 a schematic view illustrating operation of the guiding device for wood cutting.

Referring to FIG. 6, the guiding device 10 is placed on a wood piece 20 to be cut with the horizontal and vertical sections 111 and 112 respectively abutting against an upper side and the associated lateral side of the wood piece 20, and with the guiding member 12 at desired angle with the positioning member 11 for cutting. The user now may hold a handle 31 of a saw 30 to proceed with cutting, in which the blade (not labeled) is attracted by the magnetic elements 122 sunk in the holes 127 of the guiding member 12, i.e., the blade will be as close as possible to the lateral side of the vertical planar section 121 which provides the required guiding function. Nevertheless, the magnetic elements 122 are sunk in the holes 127 in a manner that the saw blade will not be attracted to have direct contact with the magnetic elements 122.

Accordingly, the present invention provides an easily adjustable guiding device for wood cutting, which is also compact and easy to carry. It is appreciated that provision of the protrusions 125 can be formed on the first circular section 117 instead of the second circular section 128, while the annularly disposed holes 115 are defined in the second circular section 128 without affecting the function of the guiding device.

Although the invention has been explained in relation to its preferred embodiment, it is to be understood that many other possible modifications and variations can be made without departing from the spirit and scope of the invention as hereinafter claimed.

What is claimed is:

1. A guiding device for cutting a wood piece, the wood piece having an upper horizontal surface and a side straight surface, the guiding device comprising:

a positioning member having a generally L-shaped cross-section, the positioning member including a horizontal leg for abutting the upper surface of the wood piece and a vertical leg extending downwardly from the horizontal leg for abutting the side straight surface of the wood piece for positioning the guiding device relative to the wood piece;

the positioning member further having a first circular portion at an end thereof, the first circular portion having a horizontal lower side that is substantially coplanar with a lower surface of said horizontal leg and a horizontal upper side with a boss projecting upwardly from and perpendicularly to said upper side, wherein said boss and said vertical leg extend away from a horizontal plane of said horizontal leg in opposite vertical directions;

a guiding member including a second vertical portion for guiding a saw blade, said guiding member further including a second circular portion at an end thereof, the second circular portion having an underside provided with a recess pivotally receiving the boss therein to provide a pivotal relationship between the positioning member and the guiding member;

a plurality of holes provided in and arranged annularly about one of the first and second circular portions, and at least one positioning protrusion projecting from the other of the first and second circular portions and removably inserted into a respective one of said holes for positive engagement against pivotal movement between the circular portions in a selected one of a plurality of pivotal positions; and adjusting means for releasably securing the guiding member to the positioning member in one of said selected pivotal positions;

the adjusting means including a bolt connected between the first and second circular portions, and a spring positioned in the recess between the first and second circular portions to bias them apart to facilitate adjustment between said plurality of pivotal positions.

* * * * *